United States Patent [19]
Maimone

[11] Patent Number: 5,864,837
[45] Date of Patent: Jan. 26, 1999

[54] METHODS AND APPARATUS FOR EFFICIENT CACHING IN A DISTRIBUTED ENVIRONMENT

[75] Inventor: William D. Maimone, Birdsboro, Pa.

[73] Assignee: Unisys Corporation, Blue Bell, Pa.

[21] Appl. No.: 662,305

[22] Filed: Jun. 12, 1996

[51] Int. Cl.$^6$ .................................................. G06F 17/30
[52] U.S. Cl. .................................................. 707/1; 707/8
[58] Field of Search ................................ 395/601, 607, 395/608, 609, 610, 611, 616, 701, 702, 703, 704, 705, 712, 716, 683, 828; 341/51

[56] References Cited

U.S. PATENT DOCUMENTS

| | | | |
|---|---|---|---|
| 4,897,781 | 1/1990 | Chang et al. | 364/200 |
| 5,113,519 | 5/1992 | Johnson et al. | 395/600 |
| 5,151,989 | 9/1992 | Johnson et al. | 395/600 |
| 5,226,117 | 7/1993 | Miklos | 395/157 |
| 5,226,143 | 7/1993 | Baird et al. | 395/425 |
| 5,251,315 | 10/1993 | Wang | 395/600 |
| 5,361,199 | 11/1994 | Shoquist et al. | 364/401 |
| 5,388,255 | 2/1995 | Pytlik et al. | 395/600 |
| 5,390,328 | 2/1995 | Frey et al. | 395/683 |
| 5,493,728 | 2/1996 | Solton et al. | 395/250 |
| 5,532,693 | 7/1996 | Winters et al. | 341/51 |
| 5,574,898 | 11/1996 | Leblang et al. | 395/601 |
| 5,603,026 | 2/1997 | Demers et al. | 395/608 |
| 5,619,716 | 4/1997 | Nonaka te al. | 395/716 |
| 5,649,200 | 7/1997 | Leblang et al. | 395/703 |
| 5,655,148 | 8/1997 | Richman et al. | 395/828 |

*Primary Examiner*—Thomas G. Black
*Assistant Examiner*—Ruay Lian Ho
*Attorney, Agent, or Firm*—John B. Sowell, Esq.; Mark T. Starr, Esq.; Steven B. Samuels, Esq.

[57] ABSTRACT

Disclosed are a method and system for transferring data objects from a server to a client in a distributed computing system. The disclosed method comprises the steps of: receiving, at the server, a request from the client for the data object; determining whether a cached copy of the requested object retained by the client is the same as a current version of the requested object retained by the server, wherein the cached copy and the current version are stored in a compressed form; and transmitting the current version of the requested object from the server to the client in the compressed form if the cached copy of the requested object is not the same as the current version of the requested object. The step of determining whether a cached copy of the requested object retained by the client is the same as a current version of the requested object comprises comparing a first relatively unique number computed on the basis of the current version of the requested object with a second relatively unique number computed on the basis of the cached copy of the requested object. The cached copy of the requested object is assumed to be the same as the current version of the requested object if the first relatively unique number is equal to the second relatively unique number.

19 Claims, 4 Drawing Sheets

(CLIENT FLOWCHART)

(SERVER FLOWCHART)

METHODS AND APPARATUS FOR EFFICIENT CACHING IN A DISTRIBUTED ENVIRONMENT

FIELD OF THE INVENTION

The present invention relates generally to distributed computing systems, and more particularly to a method and apparatus for efficiently transferring large data objects across a data communications link.

BACKGROUND OF THE INVENTION

Transferring large data objects across a data communications link is a problem for multimedia/imaging applications utilized in client/server distributed computing systems (such as the Internet's World Wide Web). One attempt at solving this problem is disclosed in U.S. Pat. No. 4,897,781, Jan. 30, 1990, titled "System And Method For Using Cached Data At A Local Node After Re-Opening A File At A Remote Node In A Distributed Networking Environment." In this system, the client processing system employs a client cache within its operating system to store data files. Utilizing the client cache minimizes the number of reads and writes that must be effected over the network to the server processing system where the file physically resides. This system prevents a process in the client processing system from accessing data in the client cache that has been modified at another node in the network by testing blocks of data in the client cache for "validity" by using modification times measured by the server processing system. In this approach, a cached file is considered invalid if its time stamp is different from the time stamp of the corresponding server file.

Another approach is disclosed in U.S. Pat. No. 5,493,728, Feb. 20, 1996, titled "System And Methods For Optimized Access In A Multi-User Environment." In this system, what is sometimes called a "dirty bit" is set periodically in the server file, and the client operates on a copy residing in a local rapid-access memory until the server file is again marked as being invalid.

One shortcoming inherent in the prior art is that the decision as to whether the cached copy of a requested data object is "valid" is made on the basis of factors not directly related to the content of the data object itself, which could lead to inefficient operation of the system in certain situations. For example, identical data objects could have different timestamps, and thus the approach disclosed in the '781 patent could result in another copy of a requested object being sent to the client even though the locally-cached object is perfectly valid in that it is the same as the current object retained by the server. Accordingly, a primary goal of the present invention is to provide an improved system for operating a distributed network wherein large data objects must be transmitted across a communications link of limited bandwidth.

SUMMARY OF THE INVENTION

The present invention utilizes compression and a "relatively unique number," or "signature," (e.g., a checksum) to reduce the amount of data to be transmitted across the network. Compression is used to speed the sending of the image over the network (essentially, the speed of the connection is increased by the reciprocal of the effective compression ratio). With local caching of previously transmitted objects, objects are retained locally by the clients in a compressed format, in case they are subsequently referenced. If they are referenced again, the checksum of the object, or other type of signature, is sent with the retrieval request for the object to the server. If the requested object is unchanged, as indicated by a comparison of its signature with that of a current version of the object retained by the server, then the server informs the client to use the local copy (or instructs the client's cache to delivery the local copy to the client browser). If the requested object has changed, the updated compressed copy is transmitted from the server to the client.

A principal advantage of the present invention is that is uses multiple techniques to reduce what needs to be transmitted to the client. If the client has the latest valid copy in cache, then the object does not need to be transmitted to the client. If the client does not have the latest copy in cache, then a compressed copy of the object is transmitted to the client. Whenever an object is transmitted to the client, the client saves the copy of the object in its local cache for possible later use. The present invention only employs the data in the object itself to determine whether the client has the latest copy in cache. This allows objects to more easily be provided by different systems and the only information that the servers need to track is the objects' data. Timestamps and dirty bits are not needed, nor are synchronized servers clocks (used in the prior art when multiple servers are used).

DETAILED DESCRIPTION OF PREFERRED EMBODIMENTS

Figure 1:
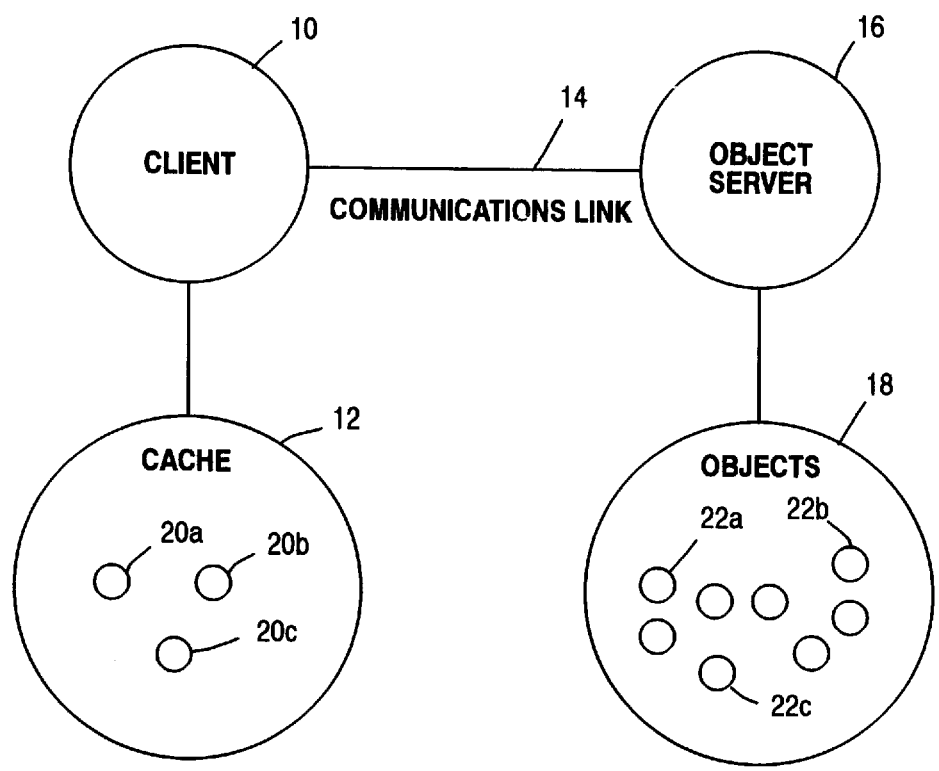
FIG. 1 schematically depicts a client/server distributed computing system in accordance with the present invention.

Referring now to FIG. 1, a distributed computing system in accordance with the present invention includes a client (10), a cache (12) operatively coupled to the client, a communications link (14) connecting the client (10) to an object server (16), and a storage mechanism (18) operatively coupled to the server (16). The cache (12) is utilized by the client (10) to store one or more data objects (20a, 20b, 20c), preferably in compressed form. Similarly, the storage mechanism (18), which preferably comprises a disk storage device, is utilized by the object server (16) to store one or more data objects (22a, 22b, 22c) in compressed form. The objects (22a, 22b, 22c) retained by the server (16) are referred to herein as "current" objects, since these are the original objects copies of which are provided to the client (10).

Figure 2:
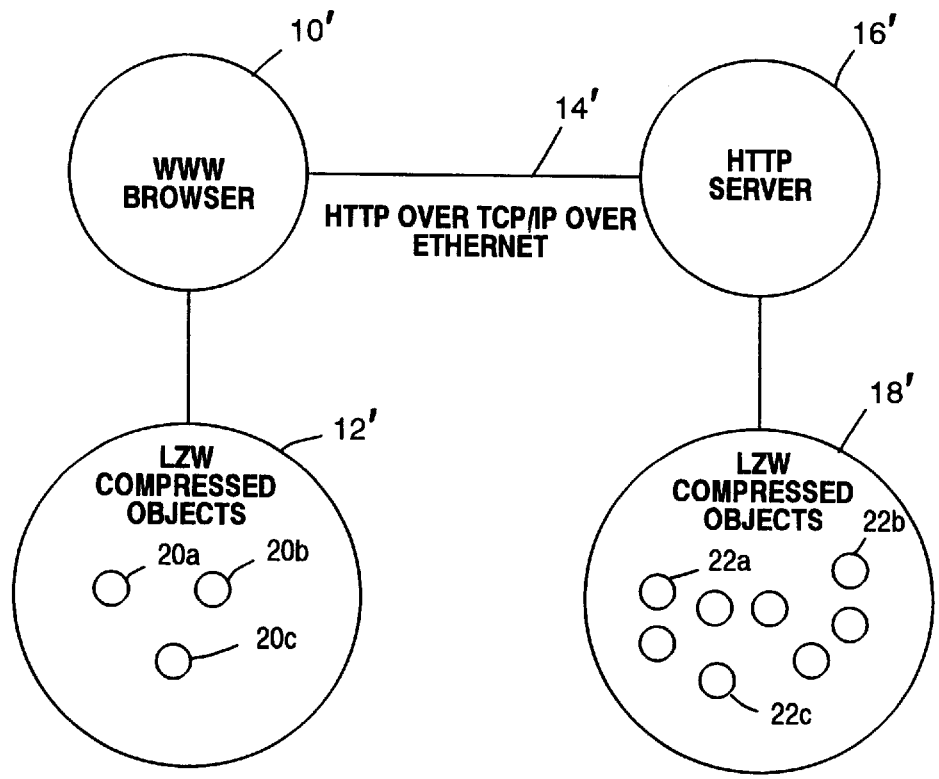
FIG. 2 schematically depicts one presently preferred implementation of the system of FIG. 1.

A presently preferred implementation of the system of FIG. 1 is depicted schematically in FIG. 2. This implementation utilizes a World Wide Web browser (10') as a client, an HTTP server (16') as a server, and an HTTP over TCP/IP over Ethernet communications link (14'). In addition, the objects (20a, 20b, 20c) retained by the client (10') in the cache (12') are compressed in accordance with the LZW compression technique, although other compression techniques could be employed. Similarly, the objects (22a, 22b, 22c) stored by the server (16') in the storage device (18') are compressed in accordance with the LZW technique. When a user of the browser (10') requests a page, the browser requests the page from the HTTP server (16'). In the request, the browser (10') sends the URL of the requested object. In addition, if the browser has a cached copy of the requested object, it sends a signature, such as a checksum, associated with the cached copy. When the HTTP server (16') receives a request for a page, it checks to determine whether the browser indicated that it had a local copy. If the browser does not have a local copy, then the server (16') sends the requested page in compressed form. If the browser has a local copy, then the server (16') compares the checksum of the browser's copy of the page with the checksum of the latest version of the page. If they match, then the browser has the latest copy of the page and the server sends a response to the browser indicating that the browser should use its local copy of the page. If the checksums do not match, then the browser does not have the latest version of the page and the server sends the latest version of the page to the browser. After the request is processed by the server (16'), the browser (10') receives a response. If the response is to use a local copy of the page, then that copy is retrieved from cache (12') and decompressed for use. If the response is that the server (16') is sending a compressed copy of the page, then the browser receives the compressed copy of the page, and the page is stored in cache and decompressed for use.

The following table is a glossary of the terms utilized in the foregoing description of the presently preferred embodiment of the invention.

Glossary

Browser—used as a client for an HTTP server. It displays pages for the user and allows the user to navigate through the pages.

Cached Objects—local copies of objects that may be used by the client if the client needs the object and the object has not changed.

Client—user of data.

Communications Link—A vehicle for communicating between a client and an object server, e.g., TCP/IP over Ethernet. The communications link could also be a fiber optic or wireless link.

HTTP—hypertext transfer protocol. This is the protocol used by World Wide Web browsers.

Object—a set of data.

Object Checksum—a particular type of object signature, or relatively unique number.

Object Name—a value that uniquely identifies a particular object.

Object Server—manage access to objects in a distributed environment.

Object Signature—a value that can be used to compare the contents of one object with another.

Page—the basic unit of information in the World Wide Web and HTTP.

URL—uniform resource locator. A URL is used uniquely to identify a World Wide Web page.

As discussed above, the presently preferred embodiment of the invention employs a checksum as the "relatively unique number" or "signature" upon which the decision is made as to whether the current version of a requested object stored by the server is the same as the cached copy of the object retained by the client. This checksum can be taken on the basis of either the object or the compressed object. However, when comparing a first checksum with a second checksum, both checksums should be based on the same form of object, i.e., compressed or uncompressed. Other types of "relatively unique numbers" include a "message digest" of the kind employed in data security systems, or a "hash" code. The basic concept, however, is that the "relatively unique number" is computed on the basis of a function which provides a relatively small likelihood that a discrepancy between two objects being compared will be missed. Those skilled in the art will readily understand that there are various, well known techniques for computing checksums, message digests, hash codes and other "relatively unique functions", and so such techniques are not described in detail herein.

Figure 3:
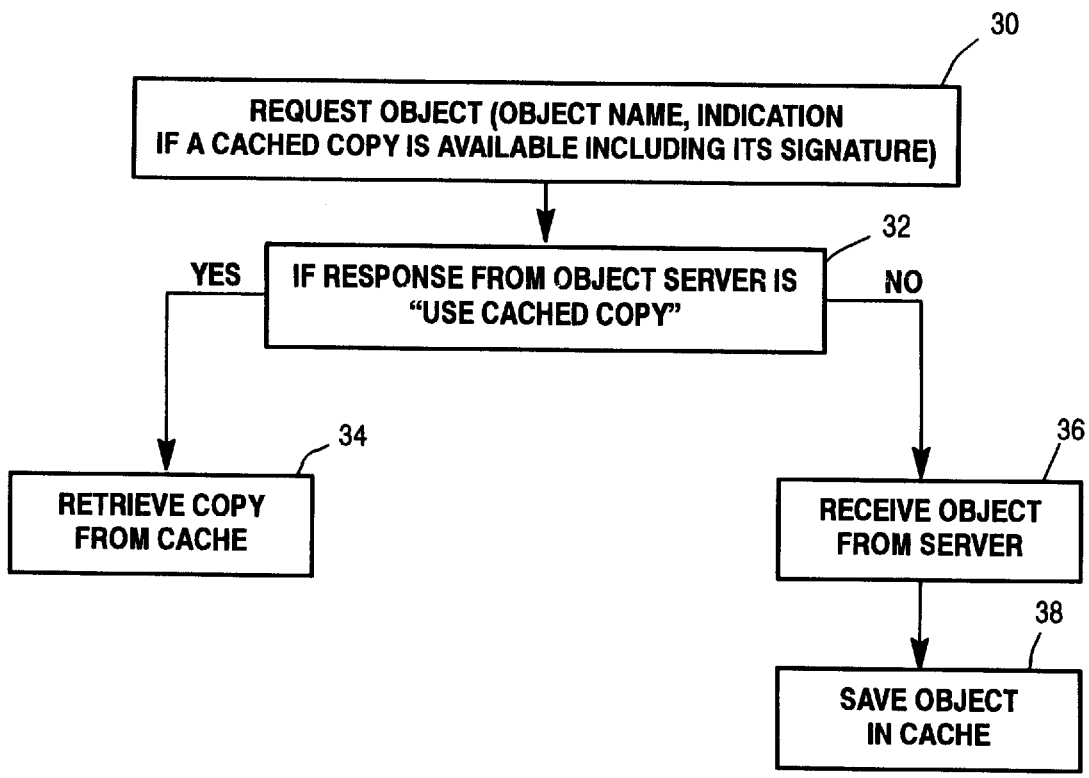
FIG. 3 is a flowchart of the operation of a client system in accordance with the present invention

Referring now to FIG. 3, the steps described above in connection with the operation of the client can now be summarized. At step 30, the client requests a given object by, e.g., sending the object's name to the server. In addition, if a cached copy is available, the client also sends a signature computed on the basis of the cached object. This relatively unique number will preferably have been precomputed by the server at the time the object was initially sent to the client. Alternatively, the client could compute the relatively unique number itself, and forward it to the server. Next, at step 32, the client examines the response from the server. If the response indicates that the client is to use the cached copy of the requested object, the client retrieves this copy from the cache, as indicated by the block representing step 34. On the other hand, if the server does not indicate that the client is to use the cached copy, the client receives the current version of the requested object from the client, as shown in step 36, and then saves a compressed form of the object in cache, as shown in step 38.

Figure 4:
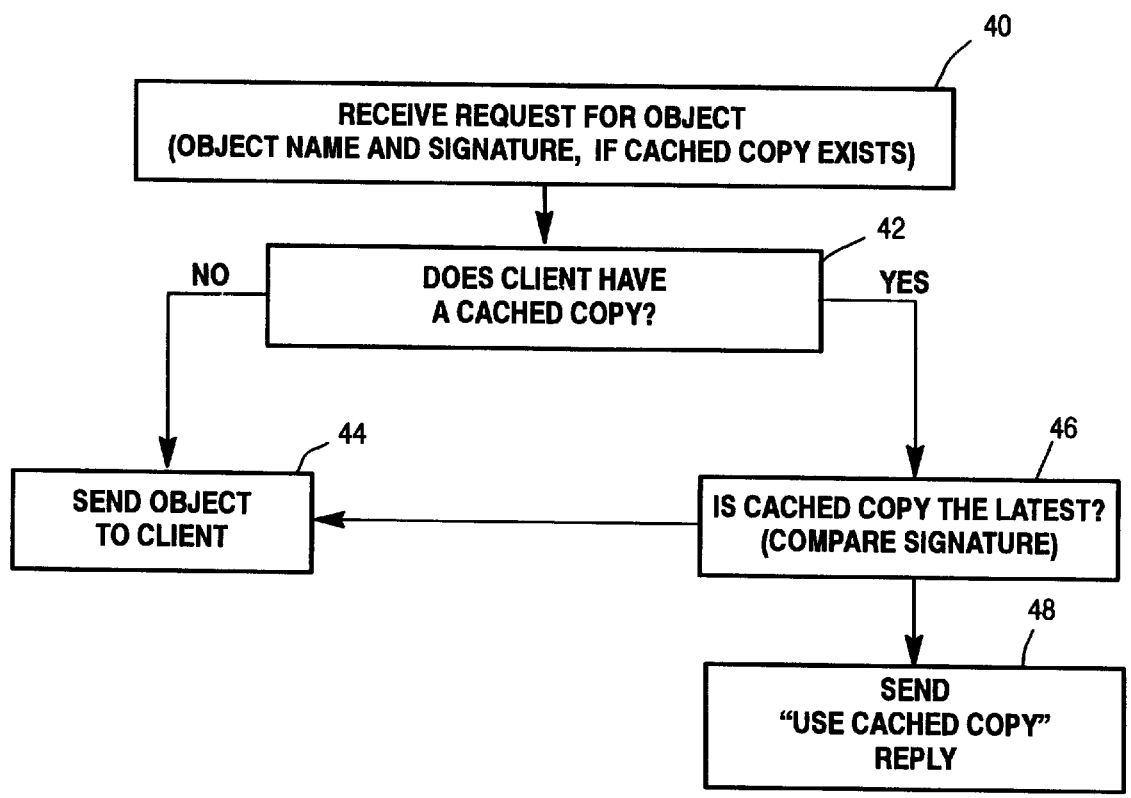
FIG. 4 is a flowchart of the operation of a server system in accordance with the present invention.

The operation of the server will now be summarized with reference to the flowchart of FIG. 4. In step 40, the server receives a request for the object. In step 42, the server determines whether the client has a cached copy of the requested object. This determination can be made on the basis of whether or not the server receives from the client the previously-computed relatively unique number, or signature, associated with the cached copy of the object. If the client does not have a cached copy of the requested object, the server sends the object in compressed form to the client, as shown in step 44. On the other hand, if the client does have a cache copy of the requested object, the server determines whether the cached copy is the same as the current version of the requested object stored by the server. This determination is made as described above on the basis of the signatures associated with the cached copy of the object and the current version of the object. If the client's cached copy of the requested object is not valid, the server proceeds to step 44 and sends the current version of the object to the client. Alternatively, if the server determines that the cached copy is the same as the current version of the requested object, the server sends a message to the client indicating that the client should utilize the cached copy of the requested object, as shown in step 48.

The following is a pseudocode example of the algorithms performed by the client and server in accordance with the present invention.

| ALGORITHM SUMMARY | |
| --- | --- |
| Client | Object Server |
| Request object (send object name and, if cached copy is available, its signature) | Receive request for object |

```
                    ALGORITHM SUMMARY
Client                          Object Server
                                If client has cached copy
                                    Determine if cached copy
                                    is latest
                                        If cached copy is latest
                                            send "use cached copy"
                                            reply
                                        else
                                            send object
                                else
                                    send object
If response is "use cache
copy"
    retrieve object from cache
else
    receive object
    save object in cache
use object
```

The scope of protection of the following claims is not intended to be limited to the specific embodiments described above, since variations of the preferred embodiments will be apparent to those skilled in the art.

I claim:

1. A method for use in a distributed computing system in which a client worksite requests an updated data object from a remote server having access to the latest version of said object, comprising the steps of:

a. generating at the client worksite a first unique number which is indicative of the content of an object previously stored at the client worksite;

b. generating at the client worksite a request for the latest version of the object presently stored on a network;

c. transmitting the unique number and a request to a server having access to the latest version of said object, over said network;

d. receiving the request and the unique number at the server;

e. computing, at the server, a second unique number indicative of the latest version of the object stored at the server;

f. comparing, at the server, said first unique number with said second unique number; and g. transmitting encoded data from said server to said client worksite which informs the client worksite whether or not the object stored at the client worksite is the latest updated version of the object requested.

2. A method as recited in claim 1, wherein said first and second unique numbers comprise a checksum of the requested data object.

3. A method as recited in claim 1, wherein said first and second unique numbers comprise a message digest of the requested data object.

4. A method as recited in claim 1, wherein said first and second relatively unique numbers comprise a hash code.

5. A method as recited in claim 1, wherein said first unique number is computed on the basis of a compressed form of the latest version of the requested object, and the second unique number is computed on the basis of a compressed form of the cached copy of the requested object.

6. A method as recited in claim 1, further comprising the step of transmitting, from said server to said client, said latest version of said object.

7. A method as recited in claim 1, wherein said latest version of the requested object and said cached copy are stored in an LZW compressed form.

8. A method as recited in claim 1, wherein said first and second unique numbers are computed by the server prior to the comparison step.

9. A method as recited in claim 1, wherein said first unique number is computed by the server, and the second unique number is computed by the client.

10. A method as recited in claim 1, wherein said first and second unique numbers comprise a checksum; wherein said latest version of the requested object and said cached copy are stored in a compressed form; and wherein said first unique number is computed on the basis of said compressed form of the latest version of the requested object, and the second unique number is computed on the basis of said compressed form of the cached copy of the requested object.

11. A method for transferring a data object from a server to a client in a distributed computing system, comprising the steps of:

a. computing a first unique number representing the version of said data object that is retained by said client;

b. transmitting a request for a latest version of said data object and said first unique number to said server;

c. computing a second unique number representing the latest version of said data object that is retained by said server;

d. comparing said first unique number with said second unique number; and e. transmitting said latest version of said data object that is retained by said server to said client if said first unique number is equal to said second unique number.

12. A method as recited in claim 11, wherein said first and second unique numbers comprise a checksum.

13. A method as recited in claim 11, wherein said first and second unique numbers comprise a message digest.

14. A method as recited in claim 11, wherein said first and second unique numbers comprise a hash code.

15. A method as recited in claim 11, wherein said first unique number is computed on the basis of a compressed form of the current version of the requested object, and the second relatively unique number is precomputed, when it is first provided to the client, on the basis of a compressed form of the cached copy of the requested object.

16. A computer system comprising:

a. a server connected via a communications link to at least one client;

b. a client memory coupled to said client;

c. a server memory coupled to said server;

d. a first data object stored in said client memory;

e. a second data object, corresponding to said first data object, stored in said server memory;

f. first computing means, coupled to said client, for computing a first unique number representing the version of said first data object stored in said client memory;

g. second computing means, coupled to said server, for computing a second unique number representing the version of said second data object stored in said server memory;

h. comparison means, coupled to said server, for comparing said first unique number with said second unique number, wherein said first data object is assumed to be the same version as said second data object if said first unique number is the same as said second unique number; and i. means for transmitting said second data object to said client when said first unique number is not the same as said second unique number.

17. A method as recited in claim 11, wherein said first and second unique numbers comprise a checksum.

18. A method as recited in claim 11, wherein said first and second unique numbers comprise a message digest.

19. A method as recited in claim 11, wherein said first and second unique numbers comprise a hash code.

* * * * *